US012743894B2

(12) United States Patent
Kim et al.

(10) Patent No.: US 12,743,894 B2
(45) Date of Patent: Sep. 22, 2026

(54) COMPUTING APPARATUS AND METHOD FOR INSPECTING LEARNING DATA

(71) Applicants: HYUNDAI MOTOR COMPANY, Seoul (KR); KIA CORPORATION, Seoul (KR)

(72) Inventors: Deuk Hyeon Kim, Seoul (KR); Min Sung Son, Gwacheon-si (KR); Sin Hyun Jeon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 247 days.

(21) Appl. No.: 18/610,731

(22) Filed: Mar. 20, 2024

(65) Prior Publication Data

US 2025/0124722 A1 Apr. 17, 2025

(30) Foreign Application Priority Data

Oct. 17, 2023 (KR) ........................ 10-2023-0138859

(51) Int. Cl.

*G06V 20/58* (2022.01)
*G06V 10/26* (2022.01)
*G06V 10/44* (2022.01)
*G06V 10/70* (2022.01)

(52) U.S. Cl.

CPC ............ *G06V 20/586* (2022.01); *G06V 10/26* (2022.01); *G06V 10/44* (2022.01); *G06V 10/70* (2022.01)

(58) Field of Classification Search

CPC ...... G06V 20/586; G06V 10/26; G06V 10/44; G06V 10/70; G06V 10/82; G06V 10/774; G06V 10/764; G06V 10/80; G06V 10/993; G06T 7/70; G06N 20/20

See application file for complete search history.

(56) References Cited

U.S. PATENT DOCUMENTS

2022/0219679 A1* 7/2022 Chen ...................... G06V 20/56
2023/0331215 A1* 10/2023 Farag ................ G01C 21/3815
2024/0029448 A1* 1/2024 Li ......................... G06V 10/44
2025/0109947 A1* 4/2025 Liu .......................... G01S 7/53

FOREIGN PATENT DOCUMENTS

KR 20240097012 A * 6/2024 .............. G06T 7/11

OTHER PUBLICATIONS

Awan, F. M., Saleem, Y., Minerva, R., & Crespi, N. (2020). A comparative analysis of machine/deep learning models for parking space availability prediction. Sensors, 20(1), 322. (Year: 2020).*

* cited by examiner

*Primary Examiner* — Jennifer Mehmood
*Assistant Examiner* — Vaisali Rao Koppolu
(74) *Attorney, Agent, or Firm* — MCDONNELL BOEHNEN HULBERT & BERGHOFF LLP

(57) ABSTRACT

A computing device includes a parking space recognition device that recognizes a parking space using at least one parking space recognition model for recognizing the parking space based on training data for the parking space and a data inspection device that inspects information about a parking line and a parking slot based on parking space recognition data recognized by the parking space recognition device.

18 Claims, 9 Drawing Sheets

| MAIN CATEGORY | SUBCATEGORY | INPUT PROPERTY VALUES |
| --- | --- | --- |
| PARKINGLINELIST | PARKINGLINEPOSITION (PARKING LINE POSITION) | STARTING POINT COORDINATES, MIDPOINT COORDINATES, END POINT COORDINATES PARKINGLINEID (WRITE PARKING MAJOR ID AND MINIOR ID, CONSTANT, AND THE LIKE) |
| | PARKINGLINETYPE (TYPE OF PARKING LINE) | SINGLELINE (SINGLE LINE), DOUBLELINE (DOUBLE LINE) |
| | PARKINGLINESTATUS (WHETHER STARTING POINT OF PARKING LINE IS VISIBLE/INVISIBLE) | VISIBLE (STARTING POINT IS VISIBLE), INVISIBLE (STARTING POINT IS INVISIBLE) |
| PARKINGSLOTLIST | PARKINGLINEPAIR (PARKING LINE PAIR CONSTITUTING PARKING SLOT) | TWO PARKINGLINEID FORMING PAIR |
| | PARKINGTYPE (TYPE OF PARKING SLOT) | PERPENDICULAR, PARALLEL, DIAGONAL, STEP |
| | PARKINGCASE (PURPOSE TYPE OF PARKING SLOT) | NORMAL, DISABLEDSIGN (DISABLED SIGN), WOMENONLYSIGN (WOMEN ONLY SIGN), EVSIGN (EV SIGN), RPPZONESIGN, OTHERS, UNKNOWN |
| | PARKINGSLOTSTATUS (OCCUPANCY STATUS TYPE OF PARKING SLOT) | OCCUPANCY, EMPTY, UNKNOWN |

FIG.4

COMPUTING APPARATUS AND METHOD FOR INSPECTING LEARNING DATA

CROSS REFERENCE TO RELATED APPLICATIONS

This application claims the benefit of priority to Korean Patent Application No. 10-2023-0138859, filed in the Korean Intellectual Property Office on Oct. 17, 2023, the entire contents of which are incorporated herein by reference.

TECHNICAL FIELD

The present disclosure relates to a computing device and a method for inspecting training data.

BACKGROUND

Various systems for assisting with the driving of a driver are loaded into a vehicle.

As an example, a parking space recognition device may be a system which assists with the parking of the vehicle, which may recognize a parking space from a surrounding image to guide the driver to the parking space and may support parking assistance when the driver attempts to park in the selected parking space.

Such a parking space recognition device may learn data using a deep learning model and may recognize a parking space from an input image based on the training data.

However, the deep learning model for parking space recognition should perform a data inspection to ensure data quality, when constructing training data and validation data.

People directly inspected training data and validation data of the deep learning model for parking space recognition in the past. However, as time and manpower necessary for data inspection increase as amounts of the training data and the validation data of the deep learning model gradually increase, cost which incurs to inspect data increase.

SUMMARY

The present disclosure has been made to solve the above-mentioned problems occurring in the prior art while advantages achieved by the prior art are maintained intact.

An aspect of the present disclosure provides a computing device for automatically performing operations for inspecting parking space recognition data recognized based on a learning model for parking space recognition without the intervention of a person to reduce a time taken to inspect data and reduce cost and a method for inspecting training data.

Another aspect of the present disclosure provides a computing device for additionally learning a parking space by means of a learning model based on the result of inspecting the data to improve the performance of the learning model and a method for inspecting training data.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a computing device may include a parking space recognition device that recognizes a parking space using at least one parking space recognition model that recognizes the parking space based on training data for the parking space and a data inspection device that inspects information about a parking line and a parking slot based on parking space recognition data recognized by the parking space recognition device.

In an embodiment, the parking space recognition device may include the at least one parking space recognition model that divides an input image for the parking space into cells with a predetermined size and number and recognize a position and a type of the parking line and the parking slot for each divided cell and a recognition device that combines results recognized from the at least one parking space recognition model to recognize the parking space and output the parking space recognition data In an embodiment, the parking space recognition data may include parking line information about a position of the parking line and a type of the parking line and parking slot information about a position of the parking slot and a type of the parking slot.

In an embodiment, the parking space recognition device may be formed as an ensemble model in which a plurality of parking space recognition models and the recognition device are coupled to each other.

In an embodiment, the data inspection device may include a position accuracy determination device that determines position accuracy of the parking space recognition data based on position information of the parking line and the parking slot, a type accuracy determination device that determines type accuracy of the parking space recognition data based on type information of the parking line and the parking slot, a position consistency analysis device that analyzes position consistency of the parking space recognition data based on the position information of the parking line and the parking slot, a type accuracy analysis device that analyzes type consistency of the parking space recognition data based on the type information of the parking line and the parking slot, and a controller that outputs the result of inspecting the parking space recognition data based on the result of analyzing accuracy and consistency for the position and the type of the parking line and the parking slot.

In an embodiment, the position accuracy determination device may calculate a probability value of a probability that there will be the parking line and the parking slot for each cell obtained by dividing the parking space and may determine the position accuracy of the parking space recognition data based on the number of cells in which the probability value is within a reference range.

In an embodiment, the position accuracy determination device may complete an inspection for the position accuracy of the parking space recognition data, when the position accuracy of the parking space recognition data is greater than or equal to a predetermined first reference value, and may perform a precise inspection for position information of the parking space recognition data, when the position accuracy of the parking space recognition data is less than the predetermined first reference value.

In an embodiment, the type accuracy determination device may determine the type accuracy of the parking space recognition data based on the number of cells in which a probability value of a probability that there will be the parking line and the parking slot for each cell obtained by dividing the parking space is greater than a reference value and entropy of the cells in which the probability value is greater than the reference value.

In an embodiment, the type accuracy determination device may complete an inspection for the type accuracy of the parking space recognition data, when the type accuracy of the parking space recognition data is greater than or equal to a predetermined second reference value, and may perform a precise inspection for type information of the parking space recognition data, when the type accuracy of the parking space recognition data is less than the predetermined second reference value.

In an embodiment, the computing device may further include a trigger generator that generates a trigger signal for additional learning of the at least one parking space recognition model, when the position accuracy of the parking space recognition data is less than a first reference value or when the type accuracy of the parking space recognition data is less than a second reference value.

In an embodiment, the position consistency analysis device may compare per-cell position information of the parking space recognition data with ground truth (GT) for per-cell position information obtained from an image of an actual parking space, counts the number of cells in which the per-cell information of the parking space recognition data is different from the GT for per-cell position information, and may analyze the position consistency of the parking space recognition data based on the number of the counted cells.

In an embodiment, the position consistency analysis device may complete an inspection of the position consistency of the parking space recognition data, when the number of the counted cells is less than a predetermined third reference value, and may add indicators for inspecting the cells in which the per-cell information of the parking space recognition data is different from the GT for per-cell position information, when the number of the counted cells is greater than or equal to the predetermined third reference value.

In an embodiment, the type consistency analysis device may calculate a per-type probability value for each cell in the parking space recognition data, may compare type information with the highest probability value for each cell with ground truth (GT) for per-cell type information obtained from an image of an actual parking space, may count the number of cells in which the type information with the highest probability value for each cell is different from the GT for per-cell type information obtained from an image of an actual parking space, and may analyze the type consistency of the parking space recognition data based on the number of the counted cells.

In an embodiment, the type consistency analysis device may complete an inspection of the type consistency of the parking space recognition data, when the number of the counted cells is less than a predetermined fourth reference value, and inspects type information for each cell, when the number of the counted cells is greater than or equal to the determined fourth reference value.

According to another aspect of the present disclosure, a method for inspecting training data may include recognizing, by a parking space recognition device, a parking space using at least one parking space recognition model that recognizes the parking space based on training data for the parking space and inspecting information about a parking line and a parking slot based on the recognized parking space recognition data, In an embodiment, the recognizing of the parking space may include dividing, by the at least one parking space recognition model, an input image for the parking space into cells with a predetermined size and number and recognizing, by the at least one parking space recognition model, a position and a type of the parking line and the parking slot for each divided cell and combining results recognized from the at least one parking space recognition model to recognize the parking space and outputting the parking space recognition data, In an embodiment, the parking space recognition data may include parking line information about a position of the parking line and a type of the parking line and parking slot information about a position of the parking slot and a type of the parking slot.

In an embodiment, the inspecting may include determining position accuracy of the parking space recognition data based on position information of the parking line and the parking slot, determining type accuracy of the parking space recognition data based on type information of the parking line and the parking slot, analyzing position consistency of the parking space recognition data based on the position information of the parking line and the parking slot, analyzing type consistency of the parking space recognition data based on the type information of the parking line and the parking slot, and outputting the result of inspecting the parking space recognition data based on the result of analyzing accuracy and consistency for the position and the type of the parking line and the parking slot.

In an embodiment, the determining of the position accuracy may include calculating a probability value of a probability that there will be the parking line and the parking slot for each cell obtained by dividing the parking space and determining the position accuracy of the parking space recognition data based on the number of cells in which the probability value is within a reference range and completing an inspection for the position accuracy of the parking space recognition data, when the position accuracy of the parking space recognition data is greater than or equal to a predetermined first reference value, and performing a precise inspection for position information of the parking space recognition data, when the position accuracy of the parking space recognition data is less than the predetermined first reference value.

In an embodiment, the determining of the type accuracy may include determining the type accuracy of the parking space recognition data based on the number of cells in which a probability value of a probability that there will be the parking line and the parking slot for each cell obtained by dividing the parking space is greater than a reference value and entropy of the cells in which the probability value is greater than the reference value and completing an inspection for the type accuracy of the parking space recognition data, when the type accuracy of the parking space recognition data is greater than or equal to a predetermined second reference value, and performing a precise inspection for type information of the parking space recognition data, when the type accuracy of the parking space recognition data is less than the predetermined second reference value.

In an embodiment, the method may further include generating a trigger signal for additional learning of the at least one parking space recognition model, when the position accuracy of the parking space recognition data is less than a first reference value or when the type accuracy of the parking space recognition data is less than a second reference value.

In an embodiment, the analyzing of the position consistency may include comparing per-cell position information of the parking space recognition data with ground truth (GT) for per-cell position information obtained from an image of an actual parking space, counting the number of cells in which the per-cell information of the parking space recognition data is different the GT for per-cell position information, and analyzing the position consistency of the parking space recognition data based on the number of the counted cells and completing an inspection for the position consistency of the parking space recognition data, when the number of the counted cells is less than a predetermined third reference value, and inspecting position information for each cell, when the number of the counted cells is greater than or equal to the predetermined third reference value.

In an embodiment, the analyzing of the type consistency may include calculating a per-type probability value for each cell in the parking space recognition data, comparing type information with the highest probability value for each cell with ground truth (GT) for per-cell type information obtained from an image of an actual parking space, counting the number of cells in which the type information with the highest probability value for each cell is different from the GT for per-cell type information obtained from an image of an actual parking space, and analyzing the type consistency of the parking space recognition data based on the number of the counted cells and completing an inspection for the type consistency of the parking space recognition data, when the number of the counted cells is less than a predetermined fourth reference value, and inspecting type information for each cell, when the number of the counted cells is greater than or equal to the predetermined fourth reference value.

BRIEF DESCRIPTION OF THE FIGURES

The above and other objects, features and advantages of the present disclosure will be more apparent from the following detailed description taken in conjunction with the accompanying drawings:

FIGS. 3 and 4 are drawings illustrating details of parking space recognition data according to an embodiment of the present disclosure.

DETAILED DESCRIPTION

Figure 1:
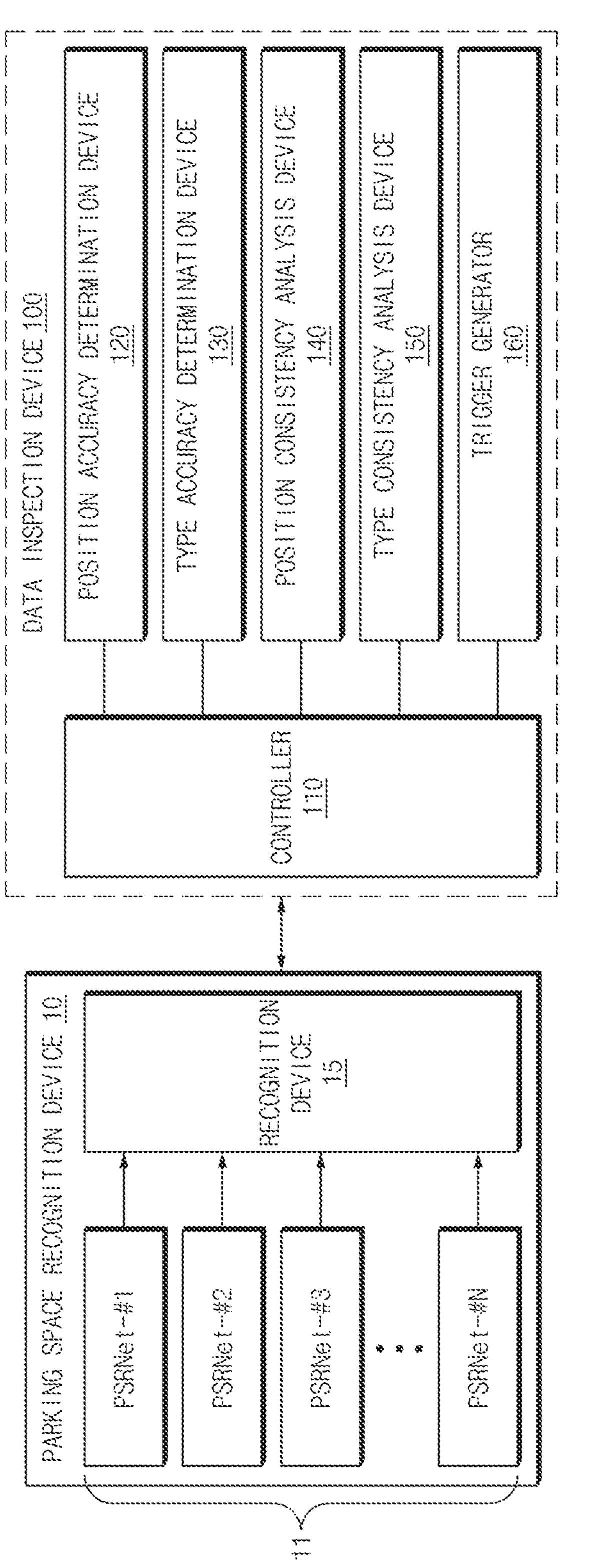
FIG. 1 is a drawing illustrating a configuration of a computing device according to an embodiment of the present disclosure.

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as "first", "second", "A", "B", "(a)", "(b)", and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
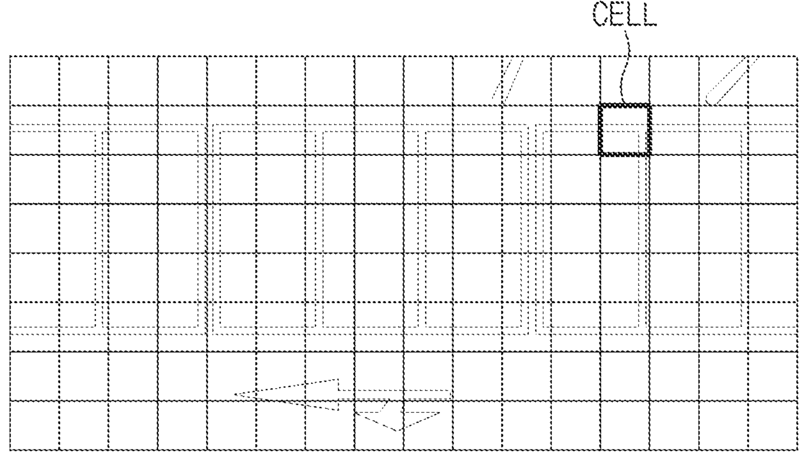
FIG. 2 is a drawing referenced to describe an operation of recognizing a parking space according to an embodiment of the present disclosure.
Figure 3:
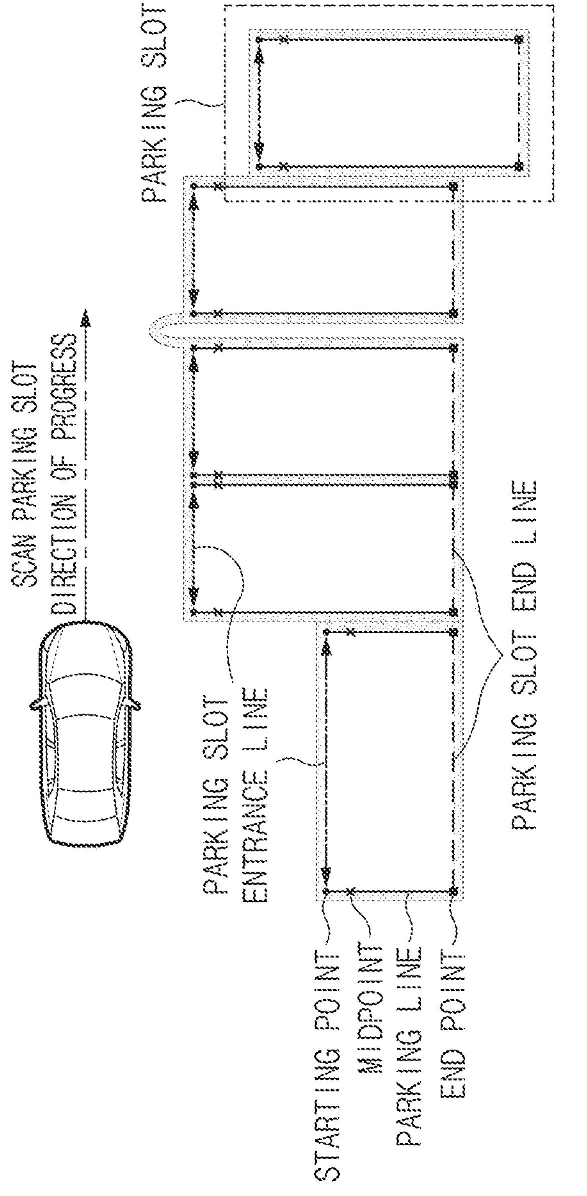

FIG. 1 is a drawing illustrating a configuration of a computing device according to an embodiment of the present disclosure. FIG. 2 is a drawing referenced to describe an operation of recognizing a parking space according to an embodiment of the present disclosure. FIGS. 3 and 4 are drawings illustrating details of parking space recognition data according to an embodiment of the present disclosure.

Referring to FIG. 1, the computing device according to an embodiment of the present disclosure may include a parking space recognition device 10 and a data inspection device 100.

When parking space recognition data recognized from the parking space recognition device 10 is received, the data inspection device 100 may determine the accuracy of a position and a type based on information, such as a parking line and a parking slot identified from the received data, and may analyze consistency between the position and the type to inspect the parking space recognition data.

Herein, the parking space recognition device 10 may be configured to include a plurality of parking space recognition models PSRNet #1 to PSRNet #N 11 and a recognition device 15.

The plurality of parking space recognition models 11 may recognize a parking space based on training data for the parking space. Each of the plurality of parking space recognition models 11 may estimate and output a position and a type of a parking line and a parking slot from an input image based on the training data.

At this time, as shown in FIG. 2, the plurality of parking space recognition models 11 may divide the input image into cells corresponding to a set size and number and may estimate and output a position and a type of a parking line and a parking slot on a cell-by-cell basis based on the training data. Herein, the size of the cells and the number of the cells may be flexibly set according to a size of the input image. As an example, the size of the input image is 1023×1024, the size of the cells may be set to 32×32 and the number of the cells may be set to 1024.

The recognition device 15 may combine output values of the plurality of parking space recognition models 11 to finally recognize the parking space. Herein, the recognition device 15 may sort the output values of the plurality of parking space recognition models 11 on a cell-by-cell basis and may select a middle value of the output values for each cell to finally recognize the parking space. As another example, the recognition device 15 may select an average value of the output values of the plurality of parking space recognition models 11 to finally recognize the parking space.

At this time, the recognition device 15 may provide a data inspection device 100 with the finally recognized parking space recognition data. Herein, the parking space recognition data may include position and type information of a parking line and a parking slot for each cell.

The data inspection device 100 may include a controller 110, a position accuracy determination device 120, a type accuracy determination device 130, a position consistency analysis device 140, a type consistency analysis device 150, and a trigger generator 160.

The controller 110 may be connected with the respective components of the data inspection device 100 to perform the overall function of the data inspection device 100. Herein, the controller 110 may be a hardware device, such as a processor or a central processing unit (CPU), or may be a program implemented by a processor.

When the parking space recognition data finally recognized from the parking space recognition device 10 is received, the controller 110 may control operations of the position accuracy determination device 120, the type accuracy determination device 130, the position consistency analysis device 140, the type consistency analysis device 150, and the trigger generator 160 to inspect the parking space recognition data finally recognized for the output values from the parking space recognition model 11.

Herein, the parking space recognition data finally recognized from the parking space recognition device 10 may be represented as shown in FIG. 3, and property values of the parking space recognition data may be represented as shown in FIG. 4.

Referring to FIGS. 3 and 4, the parking space recognition data may roughly include parking line information and parking slot information.

Herein, the parking line information may include position information of the parking line, type information of the parking line, and information about whether the starting point of the parking line is visible/invisible.

The position information of the parking line may include information, such as a starting point, a midpoint, and an end point of the parking line. As an example, the position information of the parking line may include property information such as starting point coordinates, midpoint coordinates, and end point coordinates of the parking line and a parking line ID ParkingLineid configured with a parking line major ID, a parking line minor ID, a constant, and the like.

Furthermore, the type information of the parking line may include property information, for example, a single line SingleLine or a double line DoubleLine.

Furthermore, the information about whether the starting point of the parking line is visible/invisible may include property information, for example, Visible (that the starting point is visible) or Invisible (that the starting point is invisible).

Meanwhile, the parking slot information may include position and type information of the parking slot. Furthermore, the parking slot information may further include purpose type information of the parking slot, occupancy status type information of the parking slot, and the like.

Herein, the position information of the parking slot may be indicated as information of a parking line pair constituting the parking slot. The information of the parking line pair constituting the parking slot may include property information, for example, two parking line IDs ParkingLineid forming a pair in the parking slot.

The type information of the parking slot may include property information, for example, "Perpendicular", "Parallel", "Diagonal", or "Step".

The purpose type information of the parking slot may include property information, for example, "Normal", "DisabledSign", "WomenOnlySign", "EVSign", "RPPZoneSign", "Others", or "Unknown".

The occupancy status type information of the parking slot may include property information, for example, "Occupancy", "Empty", or "Unknown".

The controller 110 may provide the position accuracy determination device 120 and the type accuracy determination device 130 with the parking space recognition data to determine the accuracy of the parking line and the parking slot for the parking space.

Thus, the position accuracy determination device 120 may determine position accuracy for the parking line and the parking slot in the recognized parking space, based on parking line and parking slot position information for each cell, which is included in the parking space recognition data input from the controller 110.

In detail, the position accuracy determination device 120 may determine position accuracy for the parking line and the parking slot, based on the starting point coordinates, the midpoint coordinates, and the end point coordinates of the parking line, the parking line ID ParkingLineid configured with the parking line major ID, the parking line minor ID, and the constant, and the two parking line IDs of the two parking lines forming a pair among the parking lines constituting the parking slot.

Herein, the position accuracy determination device 120 may calculate a probability value of a probability that there will be the parking line and the parking slot for each cell, based on the parking line and parking slot position information on a cell-by-cell basis, which is included in the parking space recognition data, and may calculate position accuracy for the parking space based on the probability value calculated for each cell.

The position accuracy for the parking space may be calculated using Equation 1 below.

$$conf.1 = \frac{1}{\text{count}(Th_{min} < p(i) < Th_{max})} \quad \text{Equation 1}$$

In Equation 1 above, conf.1 refers to the position accuracy, $Th_{min}$ refers to the minimum reference value, $Th_{max}$ refers to the maximum reference value, p(i) refers to the probability value of the probability that there will be the parking line and the parking slot in the ith cell, and count( ) refers to the function for counting the number of cells meeting the condition.

The probability value of the probability that there will be the parking line and the parking slot for each cell refers to a probability value of a probability that there will be the starting point coordinates, the midpoint coordinates, and the end point coordinates of the parking line, the parking line ID ParkingLineid configured with the parking line major ID, the parking line minor ID, the constant, and the like, and the two parking line IDs of the two parking lines forming a pair among the parking lines constituting the parking slot on the basis of the ith cell.

Thus, the position accuracy determination device 120 may count the number of cells in which the probability value of the probability that there will be the parking line and the parking slot is within a reference range, that is, the number of cells in which the probability value has a value between the minimum reference value and the maximum reference value and may calculate position accuracy for the parking line and the parking slot of the parking space based on a reciprocal of the number of the counted cells.

When the position accuracy identified from the position accuracy determination device 120 is less than a first reference value, the controller 110 may determine that the position of the parking space is not accurate to perform a precise inspection and may deliver the result to the trigger generator 160.

Thus, when the type accuracy is less than the first reference value, the trigger generator 160 may generate a trigger signal for additionally learning the position of the parking space. The controller 110 may deliver the trigger signal generated by the trigger generator 160 to the parking space recognition device 10.

Thus, each the parking space recognition model 11 of the parking space recognition device 10 may additionally learn the position of the parking space based on the trigger signal.

Meanwhile, when the position accuracy identified from the position accuracy determination device 120 is greater than or equal to the first reference value, the controller 110 may determine that the inspection of the position accuracy for the parking space is completed and may request the position consistency analysis device 140 to analyze position consistency for the parking line and the parking slot of the parking space.

Thus, the type accuracy determination device 130 may determine type accuracy for the parking line and the parking slot in the recognized parking space, based on parking line and parking slot type information for each cell, which is included in the parking space recognition data input from the controller 110.

In detail, the type accuracy determination device 130 may determine type accuracy for a type of the parking line, whether the starting point of the parking line is visible/invisible, a type of the parking slot, a purpose type of the parking slot, an occupancy status type of the parking slot, and the like.

Herein, the type accuracy determination device 130 may calculate a probability value of a probability that there will be a parking line and a parking slot and entropy for each cell, based on the parking line and parking slot type information for each cell, which is included in the parking space recognition data, and may calculate type accuracy for the parking line and the parking slot of the parking space based on the probability value and the entropy calculated for each cell.

The type accuracy for the parking space may be calculated using Equation 2 below.

$$conf.2 = \frac{\left[\sum_i B\{p(i)\}\frac{1}{\text{Entropy}(i)}\right]}{\text{count}(B\{p(i)\} == 1)} \quad \text{Equation 2}$$

In Equation 2 above, conf.2 refers to the type accuracy, p(i) refers to the probability value of the probability that there will be the parking line and the parking slot in the ith cell, and B{p(i)} refers to the function for outputting "1" when the probability value p(i) of the probability that there will be the parking line and the parking slot in the ith cell is greater than the reference value and outputting "0" when the probability value p(i) is less than or equal to the reference value. As an example, the reference value may be set to 0.8, but not limited thereto. It is obvious that it is able to adjust it at any time depending to an implementation form.

Furthermore, Entropy(i) refers to the entropy of the ith cell, and count( ) refers to the function for counting the number of cells meeting the condition.

Herein, p(i) refers to the probability value of the probability that there will be the starting point coordinates, the midpoint coordinates, and the end point coordinates of the parking line, the parking line ID ParkingLineid configured with the parking line major ID, the parking line minor ID, the constant, and the like, and the two parking line IDs of the two parking lines forming the pair among the parking lines constituting the parking slot on the basis of the ith cell.

The type accuracy determination device 130 may count the number of cells in which the B(p(i)) value is "1" for each cell based on the probability value p(i) of the probability that there will be the parking line and the parking slot in the ith cell and may calculate type accuracy for the parking line and the parking slot based on the sum of the reciprocal of the number of the counted cells and the reciprocal of the entropy of the cell in which the B(p(i)) value is "1" for each cell.

When the type accuracy identified from the type accuracy determination device 130 is less than a second reference value, the controller 110 may determine that the type for the parking line and the parking slot is not accurate to perform a precise inspection and may deliver the result to the trigger generator 160.

Thus, when the type accuracy is less than the second reference value, the trigger generator 160 may generate a trigger signal for additionally learning the type of the parking space. When the trigger signal for the additional learning is generated by the trigger generator 160, the controller 110 may deliver the generated trigger signal to the parking space recognition device 10.

Thus, each parking space recognition model 11 of the parking space recognition device 10 may additionally learn the type of the parking space based on the trigger signal.

Meanwhile, when the type accuracy identified from the type accuracy determination device 130 is greater than or equal to the second reference value, the controller 110 may determine that the inspection of the type accuracy for the parking space is completed and may request the type consistency analysis device 150 to analyze type consistency for the parking line and the parking slot of the parking space.

When it is determined that accuracy for the position of the parking space, that is, the position accuracy is greater than or equal to the first reference value by the position accuracy determination device 120, the position consistency analysis device 140 may analyze position consistency.

Herein, to identify consistency between keypoint position information of the parking space recognition data, for example, the starting point coordinates, the midpoint coordinates, and the end point coordinates of the parking line and the parking line ID ParkingLineid configured with the parking line major ID, the parking line minor ID, the constant, and the like and the two parking IDs of the two parking lines forming the pair among the parking lines constituting the parking slot, the position consistency analysis device 140 may compare the keypoint position information of the parking space recognition data with the ground truth (GT) of parking line and parking slot positions obtained from an image of an actual parking space.

At this time, the position consistency analysis device 140 may compare the keypoint position of the parking space recognition data with the GT on a cell-by-cell basis based and may count the number of cells in which the two values are different from each other.

The number of the cells counted in conjunction with the position of the parking space may be represented as Equation 3 below.

$$n1 = \text{count}(q(i) \neq B\{p(i)\}) \quad \text{Equation 3}$$

In Equation 3 above, n1 refers to the number of cells in which the keypoint position of the parking space recognition data is different from the GT, q(i) refers to the function for outputting "1" when there is the keypoint in the ith cell in the GT and outputting "0" when there is no keypoint, p(i) refers to the probability value of the probability that there will be the parking line and the parking slot in the ith cell in the parking space recognition data, B{p(i)} refers to the function for outputting "1" when p(i) is greater than the reference value and outputting "0" when p(1) is less than or equal to the reference value, and count( ) refers to the function for counting the number of cells meeting the condition.

As shown in Equation 3 above, the position consistency analysis device 140 may compare the q(i) value on the basis of the GT with B{p(i)} on the basis of the parking space recognition data for each cell and may count the number of cells in which the two values are not the same as each other.

At this time, when the number of the counted cells is greater than or equal to a third reference value, the position consistency analysis device 140 may determine that it fails to inspect the position consistency for the parking space recognition data. In this case, the position consistency analysis device 140 may add an indicator for quickly inspecting a cell with a different value from the GT to the cell. The position consistency analysis device 140 may provide the controller 110 with information of the cell to which the indicator is added.

Meanwhile time, when the number of the counted cells is less than the third reference value, the position consistency analysis device 140 may complete the inspection of the position consistency for the parking space recognition data and may provide the controller 110 with the result.

Thus, the controller 110 may output the result of inspecting the position accuracy and the position consistency for the parking space.

When it is determined that the accuracy for the type of the parking space, that is, the type accuracy is greater than or equal to the second reference value by the type accuracy determination device 130, the type consistency analysis device 150 may analyze type consistency.

Herein, to identify consistency for a type output value of the parking space recognition data, for example, the type of the parking line, whether the starting point of the parking line is visible/invisible, the type of the parking slot, the purpose type of the parking slot, the occupancy status type of the parking slot, and the like, the type consistency analysis device 150 may compare the type output value of the parking space recognition data with the GT of the type obtained from the image of the actual parking space.

At this time, the type consistency analysis device 150 may compare the type output value of the parking space recognition data with the GT on a cell-by-cell basis based and may count the number of cells in which the two values are different from each other.

The number of the cells counted in conjunction with the type of the parking space may be represented as Equation 4 below.

$$n2 = \text{count}(k(i) \neq T\{t(i)\}) \qquad \text{Equation 4}$$

In Equation 4 above, n2 refers to the number of cells in which the type output value of the parking space recognition data is different from the GT, k(i) refers to the type value of the ith cell in the GT, t(i) refers to the per-type probability value of the ith cell in the parking space recognition data, T{t(i)} refers to the function for outputting the type value with the highest t(i), and count( ) refers to the function four counting the number of cells meeting the condition.

As shown in Equation 4 above, the type consistency analysis device 150 may compare the k(i) value on the basis of the GT with T{t(i)} on the basis of the parking space recognition data for each cell and may count the number of cells in which the two values are not the same as each other.

At this time, when the number of the cells counted in conjunction with the parking space is greater than or equal to a fourth reference value, the type consistency analysis device 150 may determine that it fails to inspect the type consistency for the parking space recognition data. In this case, the type consistency analysis device 150 may add an indicator for quickly inspecting a cell with a different value from the GT to the cell. The type consistency analysis device 150 may provide the controller 110 with information of the cell to which the indicator is added.

Meanwhile time, when the number of the cells counted in conjunction with the type of the parking space is less than the fourth reference value, the type consistency analysis device 150 may complete the inspection of the type consistency for the parking space recognition data and may provide the controller 110 with the result.

Thus, the controller 110 may output the result of inspecting the type accuracy and the type consistency for the parking space.

When the inspection for the position and the type of the parking space recognition data based on the parking space recognition model 11 is completed, the controller 110 may end the inspection operation.

Each of the devices of the computing device according to the present embodiment and each of the components of the devices, which perform the above-mentioned operations, may be implemented in the form of an independent hardware device including a memory and at least one processor for processing each operation or may be driven in the form of being included in another hardware device such as a microprocessor or a universal computer system. The at least one processor may be implemented as an application specific integrated circuit (ASIC), a central processing unit (CPU), a microcontroller, a microprocessor, and/or the like. Furthermore, each of the devices and/or the components of the devices may further include a non-transitory storage medium which stores instructions executed by the at least one processor. The non-transitory storage medium may include a flash memory, a hard disk, a solid state disk (SSD), a random access memory (RAM), a static RAM (SRAM), a read only memory (ROM), a programmable ROM (PROM), an electrically erasable and programmable ROM (EEPROM), an erasable and programmable ROM (EPROM), and/or the like.

A description will be given in detail of operational flow of an apparatus for inspecting parking space recognition data according to an embodiment of the present disclosure, which has the above-mentioned configuration.

FIGS. 5 to 7B are drawings illustrating operational flow of a method for inspecting training data according to an embodiment of the present disclosure.

Figure 5:
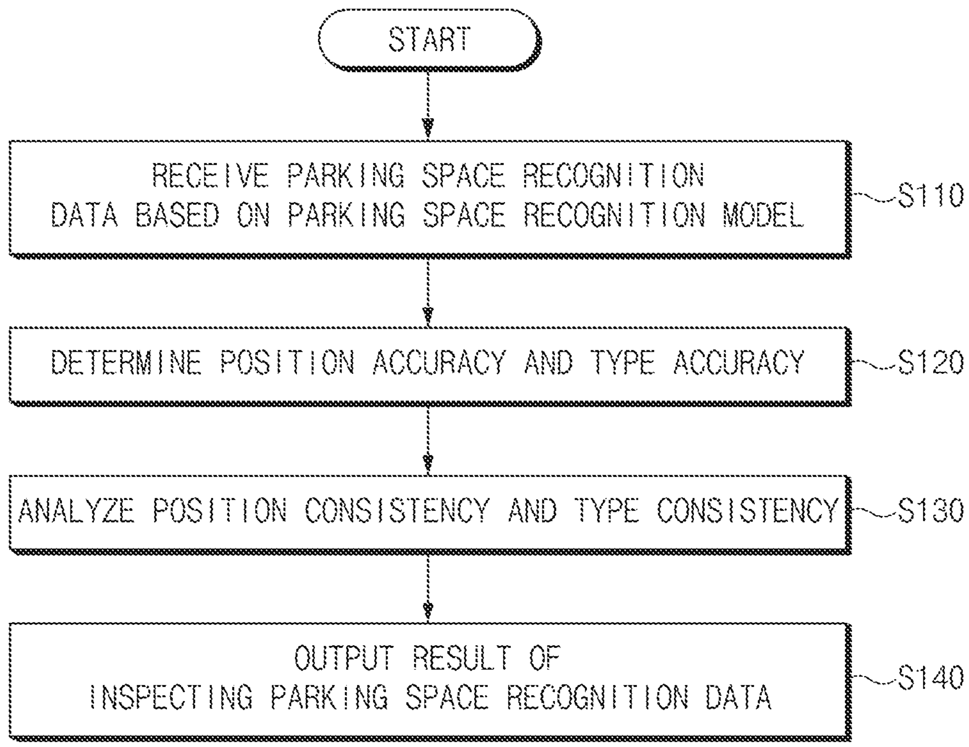
FIGS. 5, 6A, 6B, 7A, and 7B are drawings illustrating operational flow of a method for inspecting training data according to an embodiment of the present disclosure.

First of all, referring to FIG. 5, when parking space recognition data recognized based on a parking space recognition model 11 is received from a parking space recognition device 10 in S110, in S120, a data inspection device 100 may determine position accuracy and type accuracy for the parking space recognition data received in S110. Herein, detailed operational flow of S120 refers to an embodiment of FIGS. 6A and 6B.

Figure 6A:
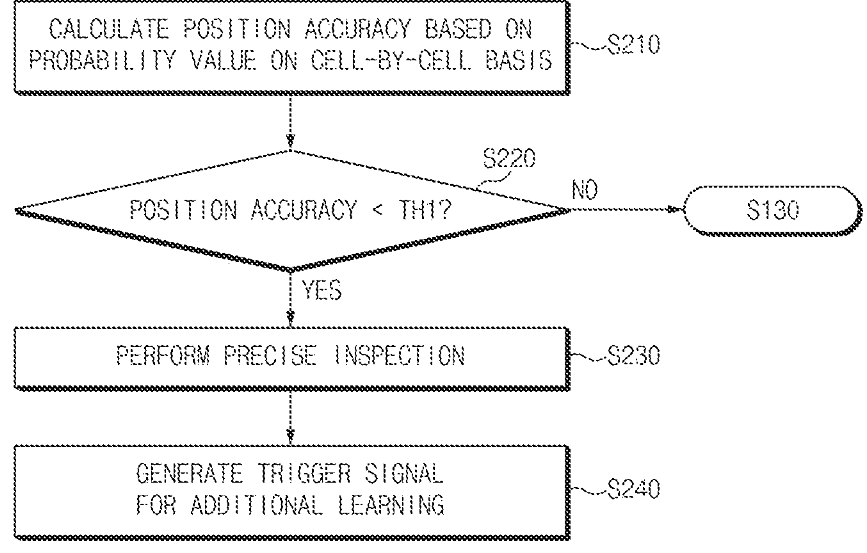
Figure 6B:
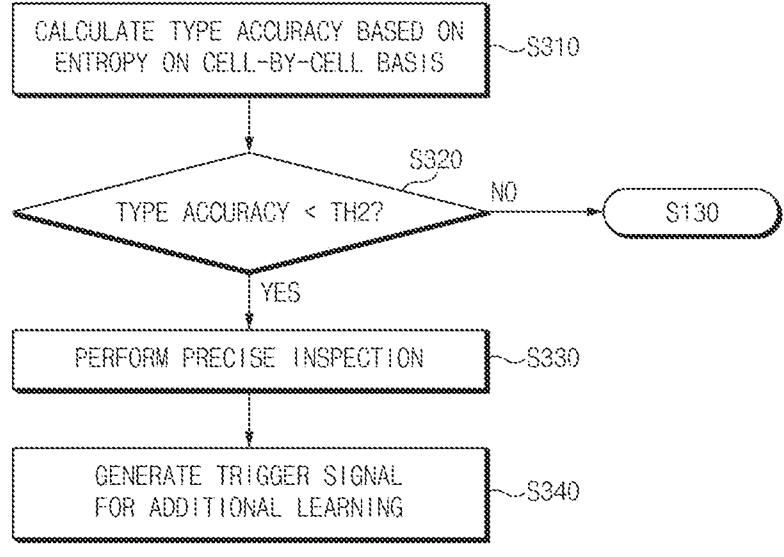

FIG. 6A illustrates flow of an operation of determining position accuracy for parking space recognition data. FIG. 6B illustrates flow of an operation of determining type accuracy for parking space recognition data.

Referring to FIG. 6A, in S210, a data inspection device 100 may calculate position accuracy based on a probability value on a cell-by-cell basis from parking space recognition data received in S110 of FIG. 5. In S210, the data inspection device 100 may calculate position accuracy with reference to Equation 1 described above.

When the position accuracy calculated in S210 is less than a predetermined first reference value TH1 in S220, in S230, the data inspection device 100 may perform a precise inspection for position information of the parking space recognition data. In S240, the data inspection device 100 may generate a trigger signal for additionally learning the position information.

Thus, the parking space recognition device 10 may additionally learn the position of the parking space by means of a parking space recognition model 11 based on the trigger signal generated in S240. In this case, the data inspection device 100 may redetermine position accuracy for the parking space recognition data based on the additionally learned result.

Meanwhile, when it is identified that the position accuracy is greater than or equal to the first reference value TH1 in S220, the data inspection device 100 may perform S130 of FIG. 5.

Referring to FIG. 6B, in S310, the data inspection device 100 may calculate entropy-based type accuracy on a cell-by-cell basis from the parking space recognition data received in S110 of FIG. 5. In S310, the data inspection device 100 may calculate type accuracy with reference to Equation 2 described above.

When the type accuracy calculated in S310 is less than a predetermined second reference value TH2 in S320, in S330, the data inspection device 100 may perform a precise inspection for type information of the parking space recognition data. In S340, the data inspection device 100 may generate a trigger signal for additionally learning the type information.

Thus, the parking space recognition device 10 may additionally learn the type of the parking space by means of the parking space recognition model 11 based on the trigger signal generated in S340. In this case, the data inspection device 100 may redetermine type accuracy for the parking space recognition data based on the additionally learned result.

Meanwhile, when it is identified that the type accuracy is greater than or equal to the second reference value TH2 in S320, the data inspection device 100 may perform S130 of FIG. 5.

Referring again to FIG. 5, when the inspection of the position accuracy and the type accuracy for the parking space recognition data is completed, in S130, the data inspection device 100 may analyze position consistency and type consistency. Herein, detailed operational flow of S130 refers to an embodiment of FIGS. 7A and 7B.

Figure 7A:
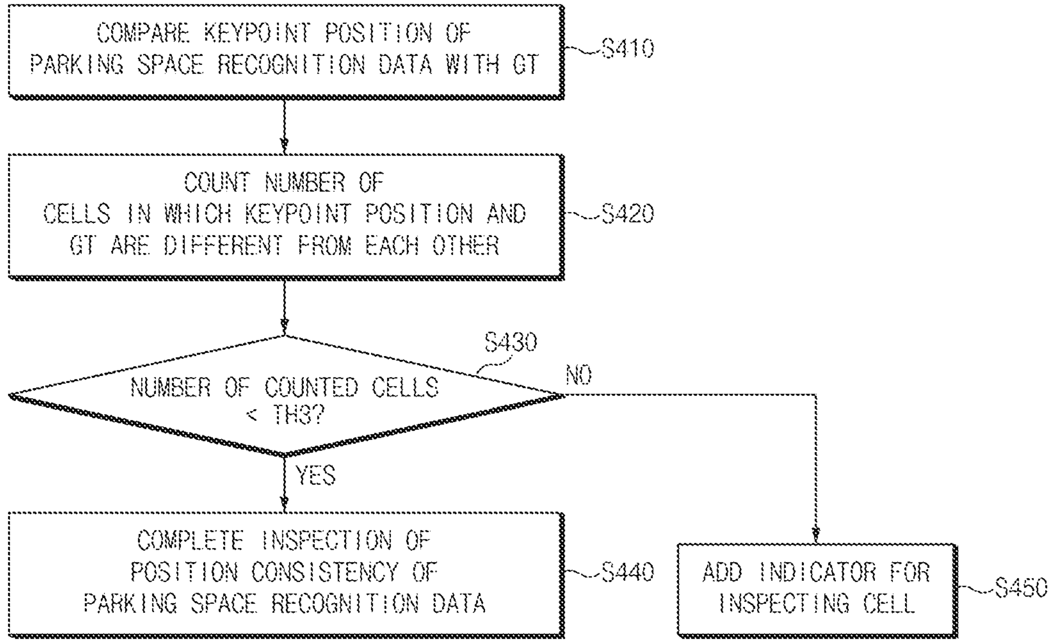
Figure 7B:
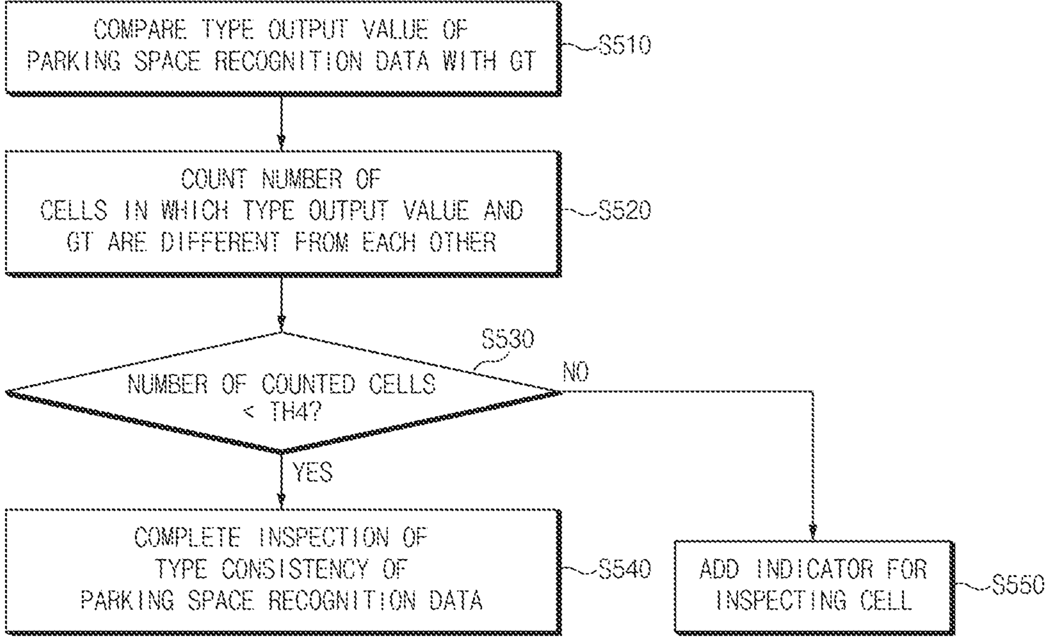

FIG. 7A illustrates flow of an operation of analyzing position consistency for parking space recognition data. FIG. 7B illustrates flow of an operation of analyzing type consistency for parking space recognition data.

Referring to FIG. 7A, before analyzing position consistency for parking space recognition data, a data inspection device 100 may receive ground truth (GT) of a parking line and parking slot position obtained from an image of an actual parking space.

Thus, in S410, the data inspection device 100 may compare a keypoint position of parking space recognition data received in S110 of FIG. 5 with the GT. In S420, the data inspection device 100 may count the number of cells in which the keypoint position of the parking space recognition data and the GT are different from each other. In S420, the data inspection device 100 may calculate the number of cells in which the two values are different from each other with reference to Equation 3 described above.

When the number of the cells counted in S420 is less than a predetermined third reference value TH3 in S430, in S440, the data inspection device 100 may complete the inspection of the position consistency of the parking space recognition data. When the number of the cells is greater than or equal to the predetermined third reference value TH3, in S450, the data inspection device 100 may determine that it fails to inspect the position consistency of the parking space recognition data and may add an indicator for inspecting a cell with a different value from the GT to the cell.

When the inspection of the position consistency is completed in S440 or S450, in S140 of FIG. 5, the data inspection device 100 may output the result of inspecting the accuracy and the consistency for the position of the parking space recognition data.

Referring to FIG. 7B, before analyzing type consistency for the parking space recognition data, the data inspection device 100 may receive ground truth (GT) of a type of a parking line and parking slot obtained from the image of the actual parking space.

Thus, in S510, the data inspection device 100 may compare a type output value of the parking space recognition data received in S110 of FIG. 5 with the GT. In S520, the data inspection device 100 may count the number of cells in which the type output value of the parking space recognition data and the GT are different from each other. In S520, the data inspection device 100 may calculate the number of cells in which the two type values are different from each other with reference to Equation 4 described above.

When the number of the cells counted in S520 is less than a predetermined fourth reference value TH4 in S530, in S540, the data inspection device 100 may complete the inspection of the type consistency of the parking space recognition data. When the number of the cells is greater than or equal to the predetermined fourth reference value TH4, in S550, the data inspection device 100 may determine that it fails to inspect the type consistency of the parking space recognition data and may add an indicator for inspecting a cell with a different value from the GT to the cell.

When the inspection of the type consistency is completed in S540 or S550, in S140 of FIG. 5, the data inspection device 100 may output the result of inspecting the accuracy and the consistency for the type of the parking space recognition data.

As described above, the computing device and the method for inspecting the training data according to an embodiment of the present disclosure may automatically perform the operations of inspecting the position and the type of the parking space recognition data recognized based on the learning model for parking space recognition without the intervention of a person to reduce a time taken to inspect the data based on the learning model and reduce cost and may additionally learn the parking space by means of the learning model based on the result of inspecting the data to improve the performance of the learning model.

According to an embodiment of the present disclosure, the computing device may automatically perform operations for inspecting parking space recognition data recognized based on a learning model for parking space recognition without the intervention of a person, thus reducing a time taken to inspect data and reducing cost.

Furthermore, according to an embodiment of the present disclosure, the computing device may additionally learn a parking space by means of a learning model based on the result of inspecting the data, thus improving the performance of the learning model.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A computing device, comprising:

a memory storing computer-executable instructions; and a processor configured to access the memory and execute the instructions, wherein the processor is configured to:

recognize a parking space using at least one parking space recognition model configured to recognize the parking space based on training data for the parking space;

inspect information about a parking line and a parking slot based on parking space recognition data recognized by a parking space recognition device;

combine results recognized from the at least one parking space recognition model to recognize the parking space and output the parking space recognition data;

determine position accuracy of the parking space recognition data based on position information of the parking line and the parking slot;

determine type accuracy of the parking space recognition data based on type information of the parking line and the parking slot; and calculate a probability value of a probability that there will be the parking line and the parking slot for each cell obtained by dividing the parking space and determines the position accuracy of the parking space recognition data based on the number of cells in which the probability value is within a reference range;

wherein the at least one parking space recognition model configured to divide an input image for the parking space into cells with a predetermined size and number, and to recognize a position and a type of the parking line and the parking slot for each divided cell; and wherein the parking space recognition data includes parking line information about a position of the parking line and a type of the parking line and parking slot information about a position of the parking slot and a type of the parking slot.

2. The computing device of claim 1, wherein the parking space recognition device is formed as an ensemble model in which a plurality of parking space recognition models and the recognition device are coupled to each other.

3. The computing device of claim 1, wherein the processor is further configured to:

analyze position consistency of the parking space recognition data based on the position information of the parking line and the parking slot;

analyze type consistency of the parking space recognition data based on the type information of the parking line and the parking slot; and output the result of inspecting the parking space recognition data based on the result of analyzing accuracy and consistency for the position and the type of the parking line and the parking slot.

4. The computing device of claim 1, wherein the processor is further configured to complete an inspection for the position accuracy of the parking space recognition data, when the position accuracy of the parking space recognition data is greater than or equal to a predetermined first reference value, and performs a precise inspection for position information of the parking space recognition data, when the position accuracy of the parking space recognition data is less than the predetermined first reference value.

5. The computing device of claim 1, wherein the processor is further configured to determine the type accuracy of the parking space recognition data based on the number of cells in which a probability value of a probability that there will be the parking line and the parking slot for each cell obtained by dividing the parking space is greater than a reference value and entropy of the cells in which the probability value is greater than the reference value.

6. The computing device of claim 5, wherein the processor is further configured to complete an inspection for the type accuracy of the parking space recognition data, when the type accuracy of the parking space recognition data is greater than or equal to a predetermined second reference value, and performs a precise inspection for the type information of the parking space recognition data, when the type accuracy of the parking space recognition data is less than the predetermined second reference value.

7. The computing device of claim 1, wherein the processor is further:

configured to generate a trigger signal for additional learning of the at least one parking space recognition model, when the position accuracy of the parking space recognition data is less than a first reference value or when the type accuracy of the parking space recognition data is less than a second reference value.

8. The computing device of claim 1, wherein the processor is further configured to compare per-cell position information of the parking space recognition data with ground truth (GT) for per-cell position information obtained from an image of an actual parking space, counts the number of cells in which the per-cell information of the parking space recognition data is different from the GT for per-cell position information, and analyzes the position consistency of the parking space recognition data based on the number of the counted cells.

9. The computing device of claim 8, wherein the processor is further configured to complete an inspection of the position consistency of the parking space recognition data, when the number of the counted cells is less than a predetermined third reference value, and adds indicators for inspecting the cells in which the per-cell information of the parking space recognition data is different from the GT for per-cell position information, when the number of the counted cells is greater than or equal to the predetermined third reference value.

10. The computing device of claim 1, wherein the processor is further configured to calculate a per-type probability value for each cell in the parking space recognition data, compares type information with the highest probability value for each cell with ground truth (GT) for per-cell type information obtained from an image of an actual parking space, counts the number of cells in which the type information with the highest probability value for each cell is different from the GT for per-cell type information obtained from an image of an actual parking space, and analyzes the type consistency of the parking space recognition data based on the number of the counted cells.

11. The computing device of claim 10, wherein the processor is further configured to complete an inspection of the type consistency of the parking space recognition data, when the number of the counted cells is less than a predetermined fourth reference value, and inspects type information for each cell, when the number of the counted cells is greater than or equal to the predetermined fourth reference value.

12. A method for inspecting training data, the method comprising:

recognizing, by a parking space recognition device, a parking space using at least one parking space recognition model configured to recognize the parking space based on training data for the parking space; and inspecting information about a parking line and a parking slot based on the recognized parking space recognition data;

wherein the recognizing of the parking space includes:

dividing, by the at least one parking space recognition model, an input image for the parking space into cells with a predetermined size and number and recognizing, by the at least one parking space recognition model, a position and a type of the parking line and the parking slot for each divided cell; and combining results recognized from the at least one parking space recognition model to recognize the parking space and outputting the parking space recognition data; and wherein the inspecting includes:

determining position accuracy of the parking space recognition data based on position information of the parking line and the parking slot; and determining type accuracy of the parking space recognition data based on type information of the parking line and the parking slot;

wherein the determining of the position accuracy includes:

calculating a probability value of a probability that there will be the parking line and the parking slot for each cell obtained by dividing the parking space and determining the position accuracy of the parking space recognition data based on the number of cells in which the probability value is within a reference range; and wherein the parking space recognition data includes parking line information about a position of the parking line and a type of the parking line and parking slot information about a position of the parking slot and a type of the parking slot.

13. The method of claim 12, wherein the inspecting includes:

analyzing position consistency of the parking space recognition data based on the position information of the parking line and the parking slot;

analyzing type consistency of the parking space recognition data based on the type information of the parking line and the parking slot; and outputting the result of inspecting the parking space recognition data based on the result of analyzing accuracy and consistency for the position and the type of the parking line and the parking slot.

14. The method of claim 13, wherein the determining of the position accuracy includes:

completing an inspection for the position accuracy of the parking space recognition data, when the position accuracy of the parking space recognition data is greater than or equal to a predetermined first reference value, and performing a precise inspection for position information of the parking space recognition data, when the position accuracy of the parking space recognition data is less than the predetermined first reference value.

15. The method of claim 13, wherein the determining of the type accuracy includes:

determining the type accuracy of the parking space recognition data based on the number of cells in which a probability value of a probability that there will be the parking line and the parking slot for each cell obtained by dividing the parking space is greater than a reference value and entropy of the cells in which the probability value is greater than the reference value; and completing an inspection for the type accuracy of the parking space recognition data, when the type accuracy of the parking space recognition data is greater than or equal to a predetermined second reference value, and performing a precise inspection for the type information of the parking space recognition data, when the type accuracy of the parking space recognition data is less than the predetermined second reference value.

16. The method of claim 13, further comprising:

generating a trigger signal for additional learning of the at least one parking space recognition model, when the position accuracy of the parking space recognition data is less than a first reference value or when the type accuracy of the parking space recognition data is less than a second reference value.

17. The method of claim 13, wherein the analyzing of the position consistency includes:

comparing per-cell position information of the parking space recognition data with ground truth (GT) for per-cell position information obtained from an image of an actual parking space, counting the number of cells in which the per-cell position information of the parking space recognition data is different from the GT for per-cell position information, and analyzing the position consistency of the parking space recognition data based on the number of the counted cells; and completing an inspection for the position consistency of the parking space recognition data, when the number of the counted cells is less than a predetermined third reference value, and inspecting position information for each cell, when the number of the counted cells is greater than or equal to the predetermined third reference value.

18. The method of claim 13, wherein the analyzing of the type consistency includes:

calculating a per-type probability value for each cell in the parking space recognition data, comparing type information with the highest probability value for each cell with ground truth (GT) for per-cell type information obtained from an image of an actual parking space, counting the number of cells in which the type information with the highest probability value for each cell is different from the GT for per-cell type information obtained from an image of an actual parking space, and analyzing the type consistency of the parking space recognition data based on the number of the counted cells; and completing an inspection for the type consistency of the parking space recognition data, when the number of the counted cells is less than a predetermined fourth reference value, and inspecting type information for each cell, when the number of the counted cells is greater than or equal to the predetermined fourth reference value.

* * * * *